US011909768B2

(12) United States Patent
Barnett

(10) Patent No.: US 11,909,768 B2
(45) Date of Patent: Feb. 20, 2024

(54) METHODS, SYSTEMS, AND DEVICES RELATED TO MANAGING IN-HOME NETWORK SECURITY USING ARTIFICIAL INTELLIGENCE SERVICE TO SELECT AMONG A PLURALITY OF SECURITY FUNCTIONS FOR PROCESSING

(71) Applicant: Secure Telligence LLC, Rock Hill, SC (US)

(72) Inventor: Erik J. Barnett, Fort Mill, SC (US)

(73) Assignee: Secure Telligence LLC, Rock Hill, SC (US)

( * ) Notice: Subject to any disclaimer, the term of this patent is extended or adjusted under 35 U.S.C. 154(b) by 179 days.

(21) Appl. No.: 16/992,503

(22) Filed: Aug. 13, 2020

(65) Prior Publication Data

US 2021/0051180 A1 Feb. 18, 2021

Related U.S. Application Data

(60) Provisional application No. 62/885,951, filed on Aug. 13, 2019.

(51) Int. Cl.
*H04L 9/40* (2022.01)
*H04W 80/04* (2009.01)
*H04L 69/16* (2022.01)

(52) U.S. Cl.
CPC .......... *H04L 63/20* (2013.01); *H04L 63/0227* (2013.01); *H04L 69/16* (2013.01); *H04W 80/04* (2013.01)

(58) Field of Classification Search
None
See application file for complete search history.

(56) References Cited

U.S. PATENT DOCUMENTS

2007/0058629 A1\* 3/2007 Luft ................. H04L 67/566 370/390
2008/0183902 A1\* 7/2008 Cooper ............. H04L 67/02 709/250

(Continued)

OTHER PUBLICATIONS

*The Smart, More Secure WiFi Router;* Norton Core; https://us.norton.com/core; Aug. 10, 2020; pp. 1-10.

*Primary Examiner* — Adnan Baig
(74) *Attorney, Agent, or Firm* — Stanek Lemon Crouse & Meeks, P.A.

(57) ABSTRACT

A non-transitory computer-readable medium whose contents, when executed by a computing system of an in-home security device, cause the computing system to perform operations to provide security for an in-home network, including receiving home network internet datagrams from a modem at the in-home security device to provide received home network data packets, the received home network internet datagrams being all data packets received by the modem directed to the in-home network from outside, analyzing the received home network internet datagrams using an artificial intelligence service to identify a type of security threat included in the received home network internet datagrams, selecting a security application from among a plurality of security applications included in an in-home network security application suite based on the type of security threat identified in the received home network internet datagrams by the artificial intelligence service to provide a selected security application, using the selected security application to identify threat data packets included in the received home network internet datagrams that are associated with the type of security threat identified in the received home network internet datagrams, blocking the threat data packets from being forwarded to an in-home network router coupled to the in-home security device, and (Continued)

forwarding data packets that are not included in the threat data packets to the in-home network router.

2 Claims, 10 Drawing Sheets

(56) References Cited

U.S. PATENT DOCUMENTS

| | | | | |
|---|---|---|---|---|
| 2013/0227674 | A1* | 8/2013 | Anderson | H04L 63/1441 |
| | | | | 726/15 |
| 2014/0331274 | A1* | 11/2014 | Bitton | H04L 63/0227 |
| | | | | 726/1 |
| 2015/0281176 | A1* | 10/2015 | Banfield | H04L 63/0218 |
| | | | | 726/11 |
| 2017/0063917 | A1* | 3/2017 | Chesla | H04L 63/20 |
| 2017/0346849 | A1* | 11/2017 | Hentunen | G06F 21/556 |
| 2018/0310078 | A1* | 10/2018 | Szymanski | H04Q 11/0005 |
| 2018/0337866 | A1* | 11/2018 | Jung | H04L 47/122 |
| 2019/0109864 | A1* | 4/2019 | Eren | H04W 12/12 |
| 2019/0173909 | A1* | 6/2019 | Mixer | H04L 41/082 |
| 2021/0409487 | A1* | 12/2021 | Pi | H04L 12/66 |

* cited by examiner

ETHER TYPE VALUES FOR SOME NOTABLE PROTOCOLS

| ETHER TYPE | PROTOCOL |
| --- | --- |
| 0x0800 | INTERNET PROTOCOL VERSION 4 (IPv4) |
| 0x0806 | ADDRESS RESOLUTIO PROTOCOL (ARP) |
| 0x0842 | WAKE-ON-LAN |
| 0x22F3 | IETF TRILL PROTOCOL |
| 0x22EA | STREAM RESERVATION PROTOCOL |
| 0x6002 | DEC MOP RC |
| 0x6003 | DECNET PHASE IV, DNA ROUTING |
| 0x80 35 | REVERSE ADDRESS RESOLUTION PROTOCOL (RARP) |
| 0x809B | APPLE TALK (ETHERNET) |
| 0x80F3 | APPLE TALK ADDRESS RESOLUTION PROTOCOL (AARP) |

FIG. 8

1. BASIC COMMUNICATION
2. FIND TRAFFIC BY IP
3. FILTER BY SOURCE AND/OR DESTINATION
4. SHOW TRAFFIC BY NETWORK
5. SHOW TRAFFIC BY PORT
6. SHOW TRAFFIC BY PROTOCOL
7. SHOW IPv6 TRAFFIC
8. FIND TRAFFIC USING PORT RANGES
9. FIND TRAFFIC BASED ON PACKET SIZE
10. WRITING TO A FILE
11. ISOLATE TCP FLAGS
12. FIND HTTP USER AGENTS
13. FIND CLEARTEXT HTTP GETS
14. FIND HTTP HOSTS
15. FIND HTTP COOKIES
16. FIND SSH CONNECTIONS
17. FIND DNS TRAFFIC
18. FIND FTP TRAFFIC
19. FIND CLEARTEXT PASSWORDS
20. FIND PACKETS WITH EVIL BIT

FIG. 9

IHND MOVING VARIABLE ALGORITHM

ZERO DAY *HUMAN INTEL) - FIRST DISCOVERY OF UNKNOWN APPLICATION THAT CAUSES NEGATIVE HOME INTERNET OR LOT BEHAVIOR. NO KNOWN SIGNATURE OR RULE PRIOR TO DISCOVERY. 0 = NO / 10 = YES

GEO LOCATION IP TAG (A.I.) - LISTING OF INTERNET ROUTABLE COUNTRIES THAT PRODUCE OR TAKE IN INTERNET TRAFFIC FROM ANY HOME INTERNET OR LOT DEVICE, COUNTRIES WITH KNOWN MALICIOUS HUMAN OR APPLICATION TIES OR EVALUATED ON SLIDING SCALE. 5(WARNING) -9(REAL THREAT)

THREAT KNOWN / UNKNOWN (HUMAN INTEL/ A.I.) - HUMAN INTELLIGENCE / RESEARCH OF KNOWN THREATS. A.I. LOGIC OF COMMON THREATS KNOWN TO EXIST IE DDoS. 5(WARNING) - 9(REAL THREAT)

TREND / HISTORICAL TRACKING (A.I.) - TRACKING RECORD OF DATA HITS FOR BOTH PASSING AND BLOCKED RULES. MIN, HR, DAY, MONTHLY, YEARLY TRENDS STATS. 0(NO HITS) -5(MAX LIMIT)

PROFILE DATA (A.I.) - TRACKING RECORD OF DATA HITS FOR BOTH PASSING AND BLOCKED RULES. MIN, HR, DAY, MONTHLY, YEARLY TREND STATS. 0(NO HITS) -5(MAX LIMIT)

KNOWN VULNERABILITY (HUMAN INTEL / A.I.) - DOES A KNOWN VULNERABILITY EXIST. 1 = YES / 0 = NO

KNOWN EXPLOIT (HUMAN INTEL/ A.I.) - DOES A KNOWN EXPLOIT / RUNNING MALICIOUS CODE / RUNNING MALICIOUS APPLICATION IN THE INTERNET EXIST. 1 = YES/ 0=NO

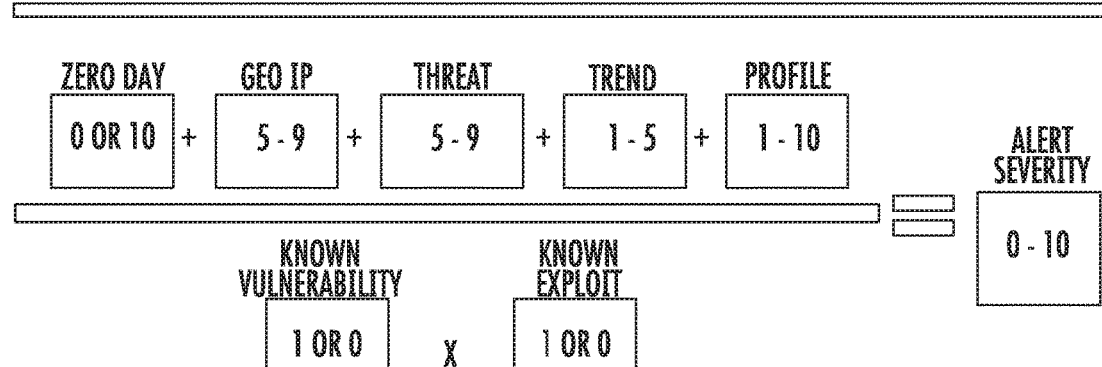

A.I. THREAT ACTION BASED ON SEVERITY - BASED ON SEVERITY IHND A.I. WILL WRITE EITHER A IHND IPTABLES BLOCK RULE (PCAP LAYER) OR A IHND IPS SIGNATURE RULE (2ND LAYER AFTER PCAP LAYER)

FIG. 11

METHODS, SYSTEMS, AND DEVICES RELATED TO MANAGING IN-HOME NETWORK SECURITY USING ARTIFICIAL INTELLIGENCE SERVICE TO SELECT AMONG A PLURALITY OF SECURITY FUNCTIONS FOR PROCESSING

CROSS-REFERENCE TO RELATED APPLICATIONS AND CLAIM FOR PRIORITY

The present application claims the priority of U.S. Provisional Patent Application Ser. No. 62/885,951 titled Methods, Systems, And Devices Related To Secure Management Of OSI Layer 2 Data Communications, filed in the U.S.P.T.O. on Aug. 13, 2019, the entire disclosure of which is hereby incorporated herein by reference.

FIELD

Embodiments according to the invention relate generally to the field of network security.

BACKGROUND

It is known to use security applications, such as firewalls and ant-virus software, to stop unauthorized access to an in-home network.

SUMMARY

Embodiment according to the invention can provide methods, systems, and devices related to managing in-home network security using artificial intelligence service to select among a plurality of security functions for processing. Pursuant to these embodiments, a non-transitory computer-readable medium whose contents, when executed by a computing system of an in-home security device, cause the computing system to perform operations to provide security for an in-home network, including receiving home network internet datagrams from a modem at the in-home security device to provide received home network data packets, the received home network internet datagrams being all data packets received by the modem directed to the in-home network from outside, analyzing the received home network internet datagrams using an artificial intelligence service to identify a type of security threat included in the received home network internet datagrams, selecting a security application from among a plurality of security applications included in an in-home network security application suite based on the type of security threat identified in the received home network internet datagrams by the artificial intelligence service to provide a selected security application, using the selected security application to identify threat data packets included in the received home network internet datagrams that are associated with the type of security threat identified in the received home network internet datagrams, blocking the threat data packets from being forwarded to an in-home network router coupled to the in-home security device, and forwarding data packets that are not included in the threat data packets to the in-home network router.

BRIEF DESCRIPTION OF THE DRAWINGS

The foregoing and other objects, features, and advantages of the present invention will become more apparent from the following detailed description when taken in conjunction with the accompanying drawings. In the drawings, similar reference characters denote similar elements throughout the different views, in which:

FIG. 8 is a schematic illustration In Ethernet two framing standard in some embodiments according to the invention.

FIG. 9 is a table listing examples of home siren sensors in some embodiments according to the invention.

FIG. 11 is a summary of the profile that the in-home network device can provide in order to assess the threat level associated with a Internet traffic that having defined attribute fields used to provide a weighted threat scoring system in some embodiments according to the invention.

DESCRIPTION OF EMBODIMENTS ACCORDING TO THE INVENTION

Figure 1:
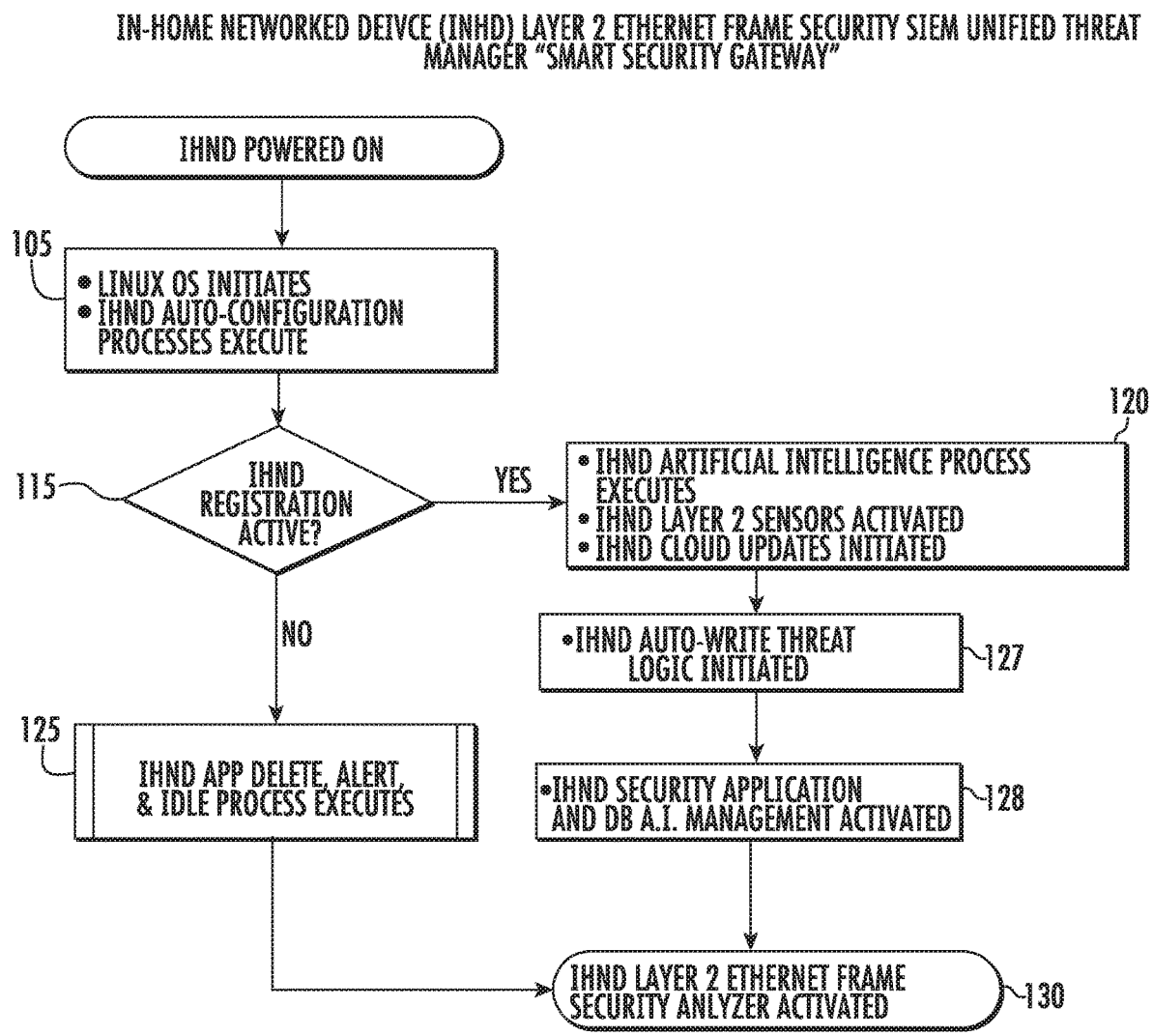
FIG. 1 is a high-level flowchart illustrating operations of an in-home security device configured to provide security for an in-home network in some embodiments according to the invention.

As appreciated by the present inventor, embodiments according to the present invention can provide in home network security in a standalone device that is configured to reside in the network between the modem (connected to the Internet) and an in home router. Still further, the standalone in home device can perform analogous to a gateway that passes only Internet datagrams that according to the different protocols employed by the in home network device present no threat to the in home network but block all other Internet datagrams that match any one of a number of protocols filtered by the in home network device.

Still further, the in home network device can implement a plurality of different approaches to identifying and acting against threats identified in the Internet datagrams. For example, in some embodiments according to the invention, the in home network device can include a blocking stack that includes iptables functioning as an operating system netfilter that can block and/or route Internet traffic or refer to a block file that may contain a list of Internet addresses. For example, this layer of protection implemented by the in home network device can analyze Internet traffic and match any of the listed following addresses available to be in home network device: bad IPV 4 addresses, bad IPV 6 addresses, bad Geo locations (IP address is known to be located in areas of the world that pose significant threats), known hackers (associated with entities known to pose threat), zero day attacks, etc. In operation if the iptables determine that the traffic matches any one of these filters then the current layer of the in home network device can block the traffic otherwise the Internet datagrams are allowed to proceed to the next level.

At the second level, the in home network device can provide a blocking stack that is referred to as an intrusion prevention system that can block Internet datagrams based on open source signatures and rules or less that are known to the public. In this layer of protection the in home network device can determine for example whether any of the Internet traffic matches any of the known signatures available in the online open source signatures. For example the in home network device at this level can determine whether the traffic is associated with a bad reputation URL, or associated with malware, or associated with a botnet, or associated with a peer to peer threat, if any of the traffic matches one of these filters then the traffic is blocked. Otherwise, the traffic is allowed to proceed to the next layer.

At the third layer of protection the in home network device can include another Internet intrusion prevention system that can block Internet traffic based on signatures and rules that are proprietary to the in home network device. In some embodiments according to the invention, the rules and signatures that are proprietary to the in home network device are developed by observing ongoing traffic and/or collaborating with other in home network devices in the same family of products and sharing the signatures in rules that are developed with one another. At this layer of protection the intrusion prevention system can block Internet traffic that matches signatures such as Internet of thing threats, zero day threats, nation state threats, a threat that matches one determined by an artificial intelligence service. If any of the data traffic matches one of these filters, then the filter blocks that traffic. Otherwise the traffic is allowed to proceed to the fourth level.

At the 4th level of protection the in home network device can provide an AI service that can read, analyze, and trend data in memory or from a database to correlate Internet attacks, and apply notification triggers and blocking measures. Which can be added to levels 1-3 described above.

FIG. 1 is a high-level flowchart illustrating operations of an in-home security device configured to provide security for an in-home network in some embodiments according to the invention. According to FIG. 1 when the in home networked security device is powered on (block 100) operations are initiated wherein the operating system, such as a Linux operating system, is initiated and establishes basic functionality and services which are utilized by the in home networked security system. During this initialization of the in home networked security services back-end scripts are initiated whereby a bridge can be established between Ethernet ports using PCAP sensors so that all data flows into a first Ethernet port and is bridged to another Ethernet port. Accordingly, all Internet datagrams that flow between the Ethernet ports can be monitored by the PCAP sensors. In operation, the In home networked security device backend scripts monitor the Internet datagrams flowing between the bridged Ethernet ports and are copied to log files Established and processed by the in home networked security system. The established log files are processed by the home science system into a database which can be monitored by the different processes administered by the in home networked security system (block 105)

Once the in home networked security system initialization is complete, the in home networked security system checks for a current registration of the in home networked security product (block 115) and if there is no valid registration for the current product then operations of the in home networked security system can be terminated (block 125). Operation of the in-home network, however, may continue without the benefit of the in home networked security system (block 130).

If there is a valid registration for the current product (block 115) then operations of the in home networked security system can continue at (block 120) wherein the in home networked security artificial intelligence service is activated, the in home networked security layer 2 sensors are activated, and the in home networked security cloud updates are initiated.

Next, the in home networked security auto-write threat logic is initiated (block 127), followed by the activation of the in home networked security application and the database for the artificial intelligence service management (block 128). At block 130 the in home networked security layer 2 Ethernet frame security analyzer is activated whereby Internet traffic can then be processed by the in home networked security system for security provisions.

Figure 2:
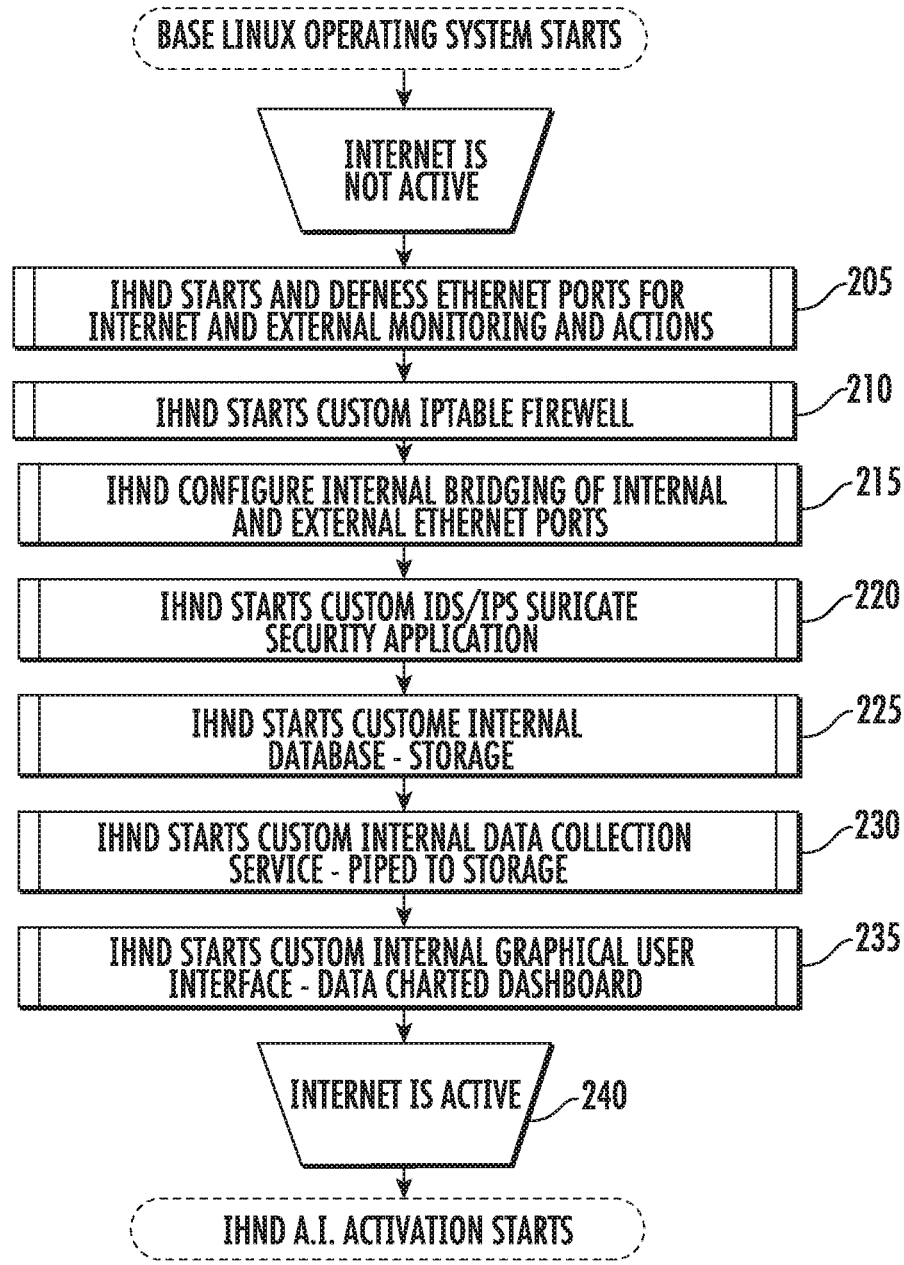
FIG. 2 is a flowchart illustrating more detailed operations of initialization of the in home networked security system shown in FIG. 1 in some embodiments according to the invention.

FIG. 2 is a flowchart illustrating more detailed operations of initialization of the in home networked security system shown in FIG. 1 (block 105) in some embodiments according to the invention. According to FIG. 2, the in home networked security autoconfiguration process is initiated after the Linux operating system begins operations and while the Internet is not currently active.

The in home networked security system defines the Ethernet ports described above for the monitoring of the Internet datagrams via PCAP 1 and PCAP 2 (block 205). The in home networked security system then initiates the custom IP table firewall that can be configured to block access to the in home network based on the analysis provided by the in home networked security system (block 210). The in home networked security system then configures the internal bridging of the two Ethernet ports described above so that the Internet datagrams can be monitored for threats at the OSI Model layer 2 (block 215). The in home networked security system then begins the custom IDS/IPS Suricarta security application (blocks 220).

The home siren system then starts the custom internal database which is configured to store the Internet datagrams that are monitored via PCAP 1 and PCAP 2 as described above (block 225). The in home networked security system then starts the custom internal data collection service which is configured to transfer the monitored Internet datagrams into a file system (block 225) and then to a database (block 230). The in home networked security system then starts the graphical user interface so that the user may monitor operations and performance of the home siren system (block 235). The Internet is allowed to be active so that Internet datagrams can flow through the in home networked security system (block 240).

Figure 3:
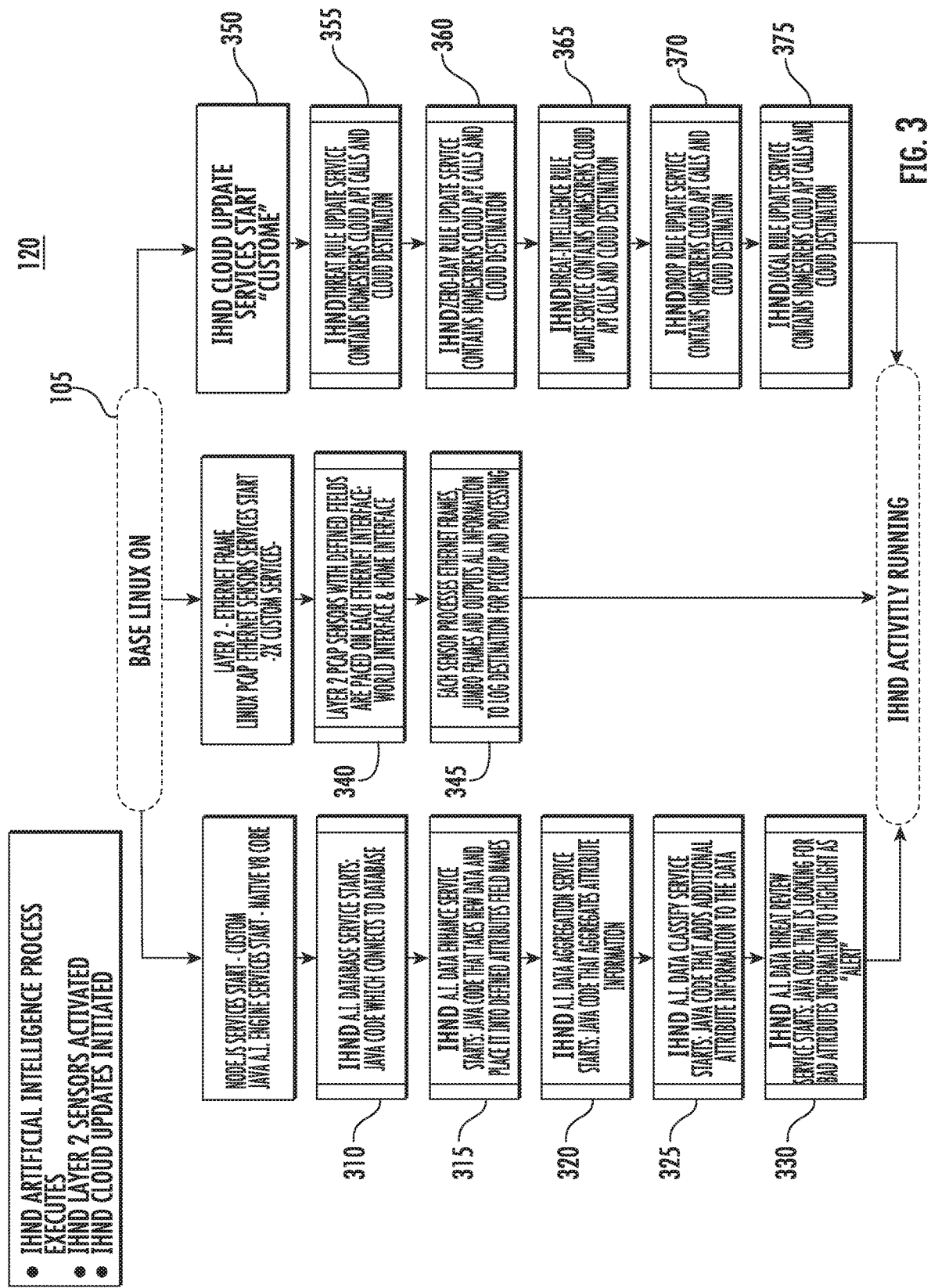
FIG. 3 is a flowchart illustrating more detailed operations of the initialization of the in home networked security artificial intelligence service, layer 2 sensors, and cloud updates described in FIG. 1 in some embodiments according to the invention.

FIG. 3 is a flowchart illustrating more detailed operations of the initialization of the in home networked security artificial intelligence service, layer 2 sensors, and cloud updates described in FIG. 1 (block 120) in some embodiments according to the invention. Operations begin after the operating system is operational wherein the in home networked security system can initiate the in home networked security artificial intelligence service including a connection to the database to which the Internet datagrams are piped (block 310). Then the in home networked security system artificial intelligence data enhanced service starts a process that accepts raw data (i.e., Internet datagrams) and places that data into defined attribute field (block 315). Then the in home networked security system AI data aggregation service starts a process whereby the attribute information describe above is aggregated among the different processes that are monitored by the artificial intelligence service (block 320). Then the in home networked security artificial intelligence data classification service starts a process that adds additional attribute information to the data being monitored (block 325). Then the in home networked security artificial intelligence data threat review service starts a process that includes looking for bad attribute information to highlight as an alert (block 330). Then the in home networked security system artificial intelligence service is initiated and may begin active operations.

Operations can continue with the in home networked security layer 2 sensor activation where the layer two Ethernet frame PCAP Ethernet sensors with defines fields are started on a pair of Ethernet ports of the in home networked security in home network device in order to monitor Internet datagrams (block 340). Then Each of the sensors processes Ethernet frames, jumbo frames, and outputs all information to a text file for further processing by the artificial intelligence service (block 345). Thereafter, the layer two Ethernet frame processing described above is active and the in home networked security system can then initiate the processing of Internet datagrams at the layer 2 level as described herein.

Operations can continue with the in home networked security Cloud update service initiation (block 350). The in home networked security system threat rule update service is made available which contains in home networked security cloud API calls and cloud destination (block 355). The in home networked security system zero day rule update service is also made available which contains in home networked security cloud API calls and cloud destination (block 360). Then the in home networked security threat intelligence rule update service is made available which contains in home networked security cloud API calls and cloud destination open (block 365). Then the in home networked security drop rule update service is made available that contains in home networked security cloud API calls and cloud destination open (block 370). Then the in home networked security system local rule update service is made available that contains in home networked security cloud API calls in cloud destination (block 375). Thereafter the in home networked security cloud update service is active and available for dynamic both generated by the present in home device as well as other in home networked security in home devices which collaborate together.

Figure 4:
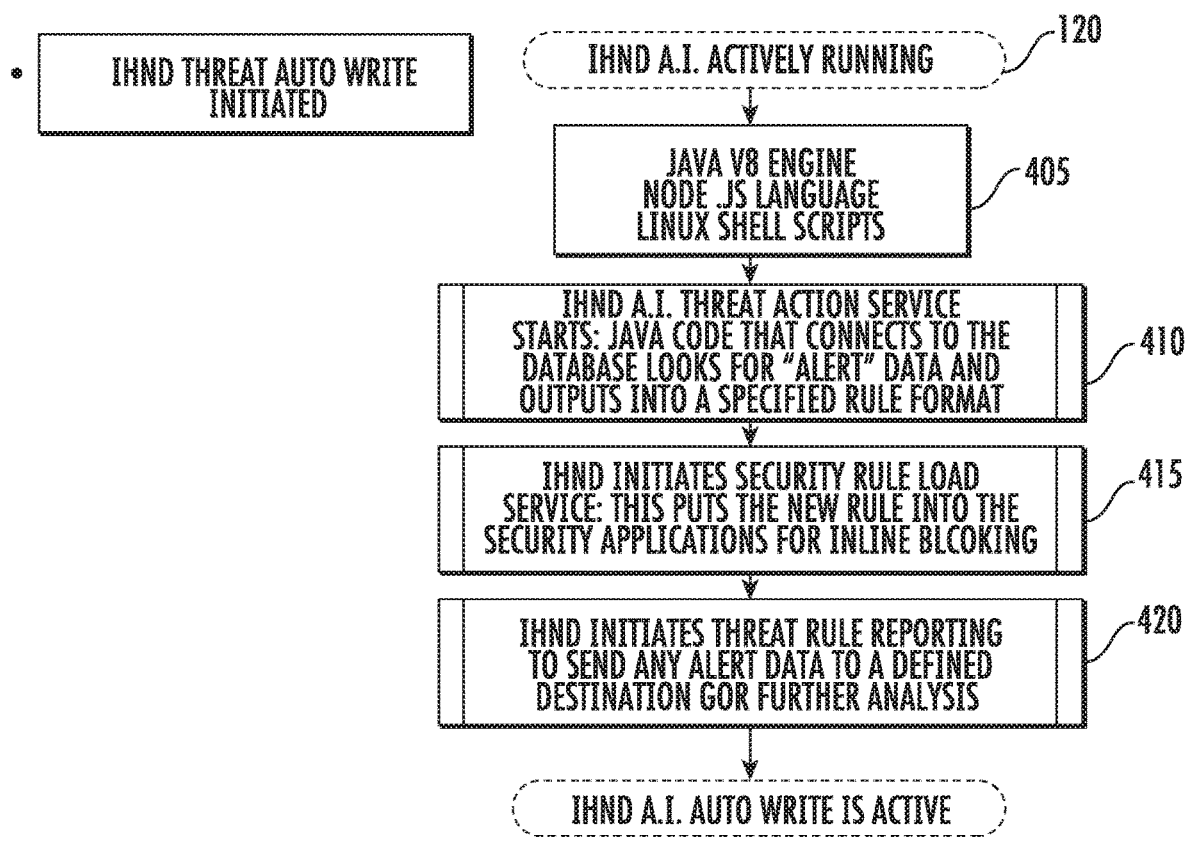
FIG. 4 is a flowchart illustrating more detailed operations of the initialization of the in home networked security auto write threat logic shown in FIG. 1 in some embodiments according to the invention.

FIG. 4 is a flowchart illustrating more detailed operations of the initialization of the in home networked security auto write threat logic shown in FIG. 1 (block 127) in some embodiments according to the invention. According to FIG. 4, the in home networked security auto-write threat logic initiation begins when the in home networked security artificial intelligence service is active (block 120). Then the in home networked security artificial intelligence threat action service begins by connecting to the database and looks for alert data and outputs a specific rule format based on any alert detected (block 410). Then in home networked security system initiates the security rule loads service which puts the new rule described above into the security applications for in line blocking (block 415). Then the in home networked security system initiates the threat rule reporting to send any alert data to a defined destination for further analysis (block 420). Thereafter, the in home networked security threat auto right service is activated and available for processing.

Figure 5:
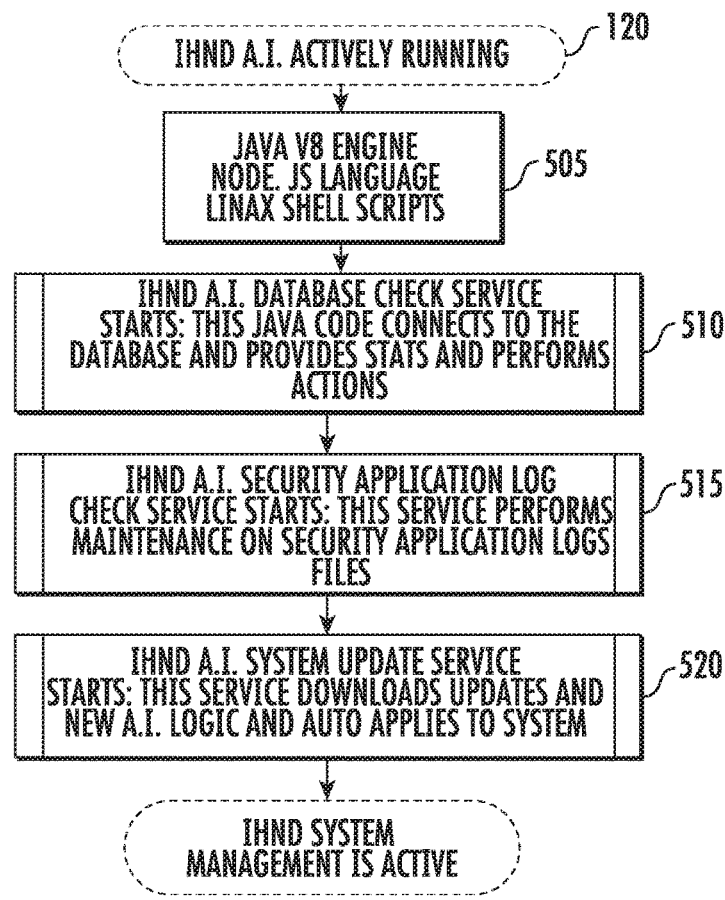
FIG. 5 is a flowchart illustrating more detailed operations of the activation of the in home networked security application and database for artificial intelligence service management described in FIG. 1 in some embodiments according to the invention.

FIG. 5 is a flowchart illustrating more detailed operations of the activation of the in home networked security application and database for artificial intelligence service management described in FIG. 1 (block 128) in some embodiments according to the invention. According to FIG. 5, the in home networked security application and database artificial intelligence management is activated after the in home networked security artificial intelligence is running (block 120). Then the in home networked security artificial intelligence database check service begins and connects to the database which provides statistics and performs actions? (block 510). Then the in home networked security artificial intelligence security application log check service starts wherein the service performs maintenance on security application logs and files (block 515). Then the in home networked security artificial intelligence system update service begins wherein the service downloads updates and new artificial intelligence logic and automatically applies the updates the logic to system (block 520). Thereafter, the in home networked security application and database artificial intelligence service management is active and available.

Referring again to FIG. 1 (block 120) and FIG. 3 (blocks 340-345), embodiments according to the present invention can provide methods, systems, and devices that can process datagrams at Layer 2 of the OSI Model to determine whether the particular datagrams represent a potential security issue to downstream processes. In particular, embodiments according to the invention can provide security applications and an artificial intelligence rules to determine whether the datagrams at Layer 2 of the OSI Model present a potential security risk. Accordingly, embodiments according to the invention can operate as a gateway device (i.e., at Layer 2 of the OSI model), rather than at Layer 3, as done for example, by routers and firewalls processing IPv4 and IPv6 protocol communications so that all internet datagrams can be processed and not just internet protocol information.

In still further embodiments, the datagrams at Layer 2 of the OSI Model may be processed by a device that is upstream from, for example, an in-home router and that is downstream from in-home modem. In some embodiments, the datagrams at Layer 2 of the OSI Model can be processed by a stand-alone-appliance that is configured upstream from the router. In still further embodiments, the datagrams at Layer 2 of the OSI Model may be processed to separate the datagrams into attribute fields which in-turn can be further processed based on those attributes. In some embodiments, the processing provided based on the attributes may result in the datagram being blocked.

Embodiments according to the invention can operate Layer 2 (data link) before any other network device to collects datagram/frame information that is not formatted as standard IPv4 and IPv6 traffic. The Artificial Intelligence engine can be based on Attribute Based Access Controls, in which the data is placed into attribute fields where an AI Policy Decision Point can determine an outcome of the datagram/frame communication (i.e., blocked/passed) as illustrated in FIG. 6.

Embodiments according to the invention can utilize datagram monitoring in conjunction with AI attribute based logic blocking, which can allow blocking any type of data from any attribute field that is created from the incoming datagram/frame communication. With Attribute based data multiple data streams can be collected and cross-correlated for further analysis and/or decisions. This will also allows creation of multiple algorithms based on target location profile.

As appreciated by the present inventor, a datagram can be defined as a self-contained, independent data carrying sufficient information to be routed from the source to the destination computer without reliance on earlier exchanges between this source and destination computer and the transporting network. Accordingly, embodiments according to the invention can allow a device to be logically placed inline to a network router that analyzes real time network transport of datagrams (or Frames), which thereby cam act as a first communication point of any target location. Still further, embodiments according to the invention can use native linux pcap on each ethernet ports which separates the internal and external network. Each sensor of the device can be programmed to collect data on any datagram/frame that passes. Using the native linx pcap, allows the processing of over 50+ types of data frames which are differentiated by frame headers.

Figures 6, 7:
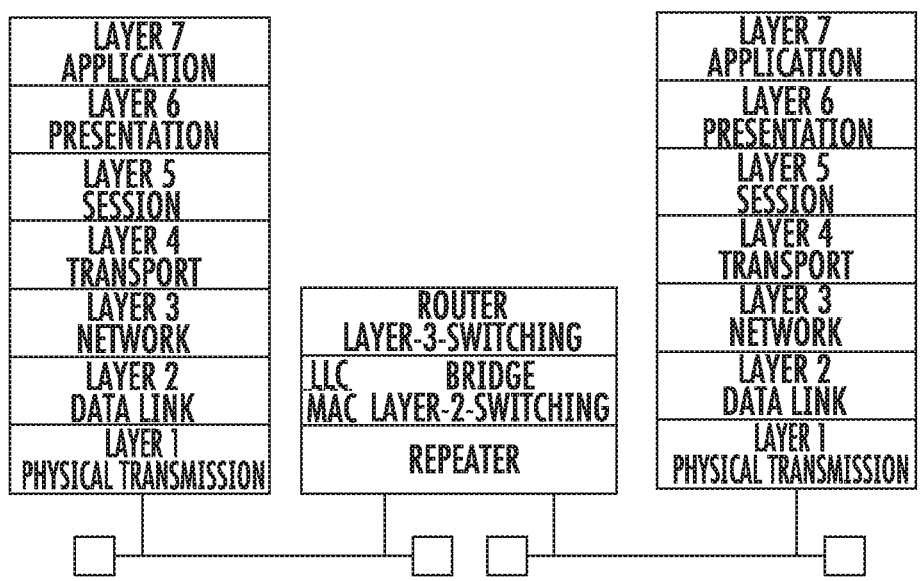
FIG. 6 is a table Illustrating the data gram nomenclature in some embodiments according to the invention.
FIG. 7 is a schematic illustration of placement of a router and additional layers of the OSI model in some embodiments according to the invention.

The network diagram of FIG. 7 illustrates placement of a router and additional layers of the OSI model and also shows additional layers below which in theory could have a device defined in some embodiments according to the invention.

Embodiments according to the invention can at Layer 2 Data Link whereas routers, firewalls may work on Layer 3. Some embodiments according to the invention can be considered a "Physical Gateway" device with security embedded to watch and block datagram/frame traffic.

A network gateway can be defined by the below:
Gateway
To connect two networks that use different protocols
It works at all seven layers of OSI model
Unlike a router a gateway can forward packets across different networks that may also use different protocols
Ex. If network A is token ring network using TCP/IP and network B is a novell-netware network, a gateway can relay frames between the two A Physical Gateway can be defined as operating at the data link layer (Layer 2) of the OSI network model. The physical gateway address is called the media access control (MAC) address or burned in address (BIA). The physical address is assigned when the device is manufactured, and cannot be changed. When a frame is sent to a device not on the local network, the gateway's MAC address is used in the frame header.

In contrast, embodiments according to the invention can provide an inline technology that acts as a security gateway, which has not been defined by the RFC. Accordingly, some embodiments according to the invention can operate as a datagram/frame security analyzer which is not limited to analyzing Internet Protocol IPv4 and IPv6 datagrams/frames. Utilizing the internal components of "Linux Packet Capture Library" (PCAP), embodiments according to the invention can collect information on any datagram/frame that traverses the internet.

As appreciated by the present inventors, a PCAP can be defines as an application programming interface (API) for capturing network traffic. Unix-like systems implement pcap in the libpcap library. Monitoring software may use libpcap, WinPcap, or Npcap to capture network packets traveling over a computer network and, in newer versions, to transmit packets on a network at the link layer, and to get a list of network interfaces for possible use with libpcap, WinPcap, or Npcap.

PCAP Linux Man-Page can be defined as a Packet Capture library providing a high level interface to packet capture systems. All packets on the network, even those destined for other hosts, are accessible through this mechanism. It also supports saving captured packets to a "savefile", and reading packets from a "savefile". Accordingly, the openness of PCAP and its ability to collect Frame header information on more than 50 different ethertypes can allow embodiments according to the invention to analyze and block internet attacks not on just IPv4 and IPv6, but any type of propriety ethertype.

According to FIG. 8, the Ethertype can be defined as a two-octet field in an Ethernet frame. It is used to indicate which protocol is encapsulated in the payload of the frame. The same field is also used to indicate the size of some Ethernet frames. EtherType was first defined by the Ethernet II framing standard, and later adapted for the IEEE 802.3 standard. This field is used by the data link layer to determine which protocol to hand over the payload to on the receiving end.

Embodiments according to the invention can be programmed with two ethernet sensors that utilizes the PCAP to monitor and collect information in real time. This information is then sent to a backend storage for artificial intelligence logic to analyze and determine if any action on the communication is needed. By default the information is passed unless blocking logic is in place.

The following code examples illustrate the applicable ways in which the operations described herein can be utilized with embodiments according to the invention:
1. Example monitoring using pcap:
To print all traffic between local hosts and hosts at Berkeley:
tcpdump net ucb-ether (http://manpages.ubuntu.com/manpages/trusty/man8/tcpdump.8.html)
2. Example In home networked security device Sensors using pcap:
Print all datagrams and frames on both inbound and outbound ethernet ports
tcpdump -i eth0
tcpdump -i eth 1
Print all datagrams that are not IPv4 communication frames
tcpdump dst in home networked security device and not ipv4
3. Other Examples are shown in FIG. 9.

Figure 10:
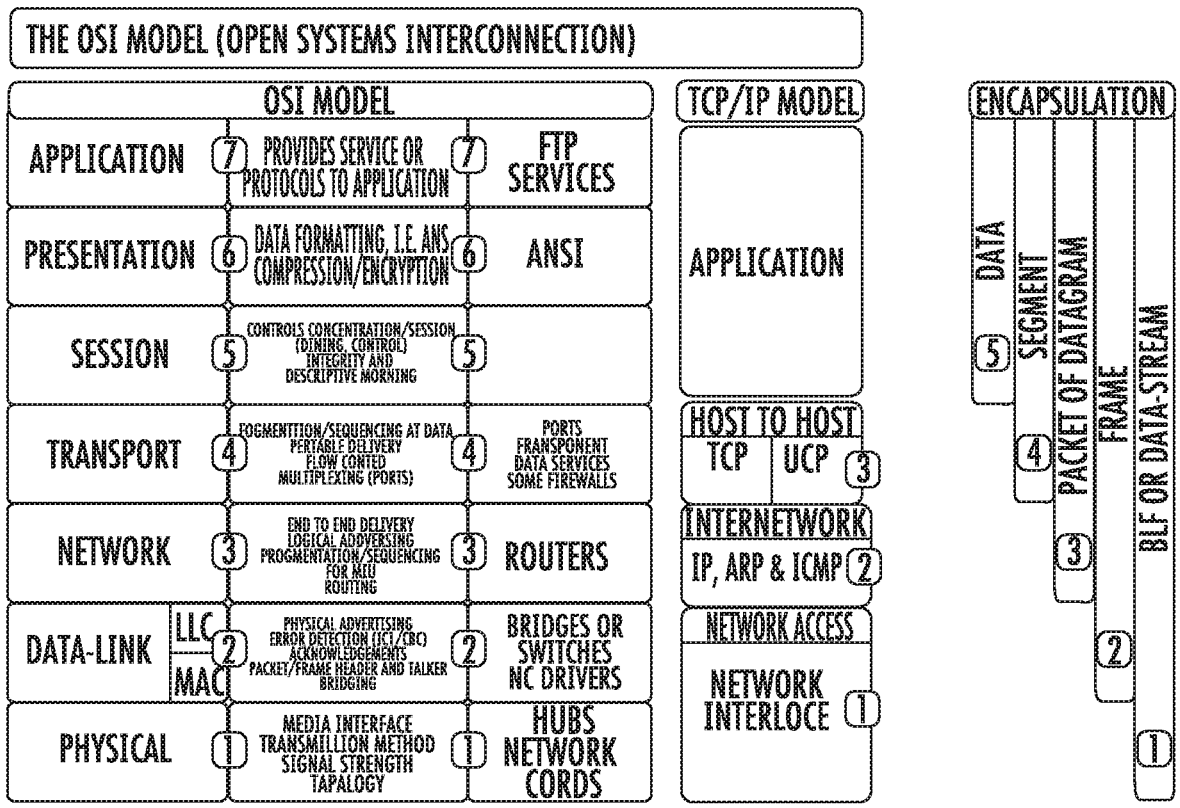
FIG. 10 is a schematic representation of the OSI model in some embodiments according to the invention.

Embodiments according to the invention can provide alternative options open to its sensors to analyze datagram and frames depending on the use case on what is being monitored in the target location, to include the impending Internet of Things technologies. FIG. 10 is a schematic representation of the OSI model in some embodiments according to the invention.

Embodiments according to the invention can "bridge" both the internal and external networks with active deployment of network monitoring sensors. And based on a rule or target devices role, can determine if the communication proceeds as a default pass or is prevented from either the internal or external network.

Embodiments according to the invention can also provide auto bridging to allow other security technologies to layered into the device to also provide other analysis and blocking capabilities. Embodiments according to the invention cab also include a layered Intrusion Prevention application, in addition IP Tables and the Sensors and Artificial Intelligence logic described herein, which can provide the ability to be a multisecurity application with A.I. built in that can cross correlate information and make a decision on the datagram/ frame in question.

Still further embodiments according to the invention can provide Artificial Intelligence Logic Engine to allow an Attribute-Based Access Control. Where a Firewall is a Rule-Based Access Control, and has no real A.I. decisioning logic on inbound or outbound data. Embodiments according to the invention can provide rule-based access control, when a request is made for access to a network or network resource, the controlling device, e.g. firewall, checks properties of the request against a set of rules. A rule might be to block an IP address, or a range of IP addresses. A rule might be to allow access to an IP address but block that IP address from use of a specific port, for example port 21 commonly used for FTP, or port 23 commonly used for Telnet. A rule might be to block a specific IP address, or block all IP addresses from accessing certain applications on the network, such as email or video steaming.

AI Attribute Based Access Control (ABAC), also known as policy-based access control, defines an access control paradigm whereby access rights are granted to users through the use of policies which combine attributes together. The policies can use any type of attributes (user attributes, resource attributes, object, environment attributes etc.). This model supports Boolean logic, in which rules contain "IF, THEN" statements about who is making the request, the resource, and the action. For example: IF the requestor is a manager, THEN allow read/write access to sensitive data. unlike role-based access control (RBAC), which employs pre-defined roles that carry a specific set of privileges associated with them and to which subjects are assigned, the key difference with ABAC is the concept of policies that express a complex Boolean rule set that can evaluate many different attributes. [1] Attribute values can be set-valued or atomic-valued. Set-valued attributes contain more than one atomic value. Examples are role and project. Atomic-valued attributes contain only one atomic value. Examples are clearance and sensitivity. Attributes can be compared to static values or to one another, thus enabling relation-based access control.

Embodiments according to the invention can achieve this Attribute Based Access Control by using the In home networked security device sensors to collect the datagrams/ frames and send them to a database. In home networked security device A.I. interacts with the database to split the datagrams/frames to the appropriate communication categories and standardizes it to an attribute format. In home networked security device Artificial Intelligence is the Policy Decision Point of the Attribute Based Access Control.

Embodiments according to the invention Raw Sensor Frame Data Examples:

IPv6 Raw Frame real example

"index" : {"_index": "packets-2019-05-06", "_type": "pcap_file"}}
{"timestamp" : "1557191168163", "layers" : {"frame_interface_name": ["eth0"],"frame_time":
["May 6, 2019 21:06:08.163344263 EDT"],"frame_protocols":
["eth:ethertype:ipv6:udp:mdns"],"eth_type": ["0x000086dd"],"eth_dst":
["33:33:00:00:00:fb"],"eth_src": ["48:a1:95:98:ee:f3"],"udp": ["User Datagram Protocol, Src
Port: 5353, Dst Port: 5353"],"ipv6": ["Internet Protocol Version 6, Src:
fe80::c61:acb2:16d7:d827, Dst: ff02::fb"],"ipv6_src":
["fe80::c61:acb2:16d7:d827"],"udp_srcport": ["5353"],"ipv6_dst": ["ff02::fb"], "udp_dstport":
["5353"]}}

IPv4 Raw Frame real example

"index" : {"_index": "packets-2019-05-06", "_type": "pcap_file"}}
{"timestamp" : "1557191169634", "layers" : {"frame_interface_name": ["eth0"],"frame_time":
["May 6, 2019 21:06:09.634203109 EDT"],"frame_protocols":
["eth:ethertype:ip:udp:dns"],"eth_type": ["0x0000800"],"eth_dst":
["d8:50:e6:cd:41:38"],"eth_src": ["00:0c:29:9f:81:f3"],"ip_len": ["68"],"ip_proto": ["17"],"udp":
["User Datagram Protocol, Src Port: 44633, Dst Port: 53"],"ip": ["Internet Protocol Version 4,
Src: 192.168.40.79, Dst: 8.8.8.8"],"ip_src": ["192.168.40.79"],"udp_srcport": ["44633"],"ip_dst":
["8.8.8.8"],"udp_dstport": ["53"],"ip_geoip_dst_summary": ["US"],"ip_geoip_dst_country":
["United States"],"ip_geoip_dst_country_iso": ["US"]}}

A.I. (Policy Decision Point) Logic Attribute Data Example:
embodiments according to the invention A.I. data splitting into attribute fields real example {"_id" : ObjectId("5d49e50b31abe03d3eade14f"),
"timestamp" : "1565123838777",
"layers" : { "frame_interface_name" : [ "enp3s0"],
  "frame_time" : [ "Aug 6, 2019 16:37:18.777449440 EDT"],
  "frame_protocols" : ["eth:ethertype:ip:tcp"],
  "eth_type" : ["0x00000800"],
  "eth_dst" : ["d8:50:e6:cd:41:38"],
  "eth_src" : ["00:0c:29:92:3f:22"],
  "ip_len" : ["52"],
  "ip_proto" : ["6"],
  "tcp" : ["Transmission Control Protocol, Src Port: 24266, Dst Port: 443, Seq: 774, -continued

```
Ack: 11208, Len: 0"],
  "ip" : ["Internet Protocol Version 4, Src: 192.168.40.81, Dst: 151.101.2.109"],
  "ip_src" : ["192.168.40.81"],
  "tcp_srcport" : ["24266"],
  "ip_dst" : ["151.101.2.109"],
  "tcp_dstport" : ["443"],
  "ip_geoip_dst_summary" : ["US"],
  "ip_geoip_dst_country" : ["United States"],
  "ip_geoip_dst_country_iso" : ["US"]
  },
"yyyy-mm-dd" : ISODate("2019-08-06T20:37:22.180Z")}
```

A.I. (Policy Decision Point) data enhancement of attribute fields real example

```
{"_id" : ObjectId("5cf1d65282bd698a009d4731"),
"timestamp" : "Fri May 31 2019 21:35:14 GMT-0400 (EDT)",
"security_app" : "In home networked security device World Sensor",
"sensor_type" : "linux pcap Aggregated",
"src_country" : ["United States"],
"src_country_summary" : ["Ashburn, US"],
"src_ip" : ["18.209.3.26"],
"src_port" : ["443"],
"dest_ip" : ["192.168.40.81"],
"dest_port" : ["28964"],
"alert_category" : "sensor hit",
"alert_severity" : "1",
"alert_action" : "pass",
"protocol" : "tcp",
"aggr_count" : 7}
```

A.I. (Policy Decision Point) Attribute based Decision Logic Example:
RansomWare Attribute blocking logic.
"IF Statement"="$match" attribute which is looking for destination ports 137, 139, 445
"Then Statement"="alert_action" attribute which is listed as block
Data is outputted to a "Auto Block Rule Database"=$out:db.in home networked security deviceThrAct
If data is not a match, then the data alert action is not changed. Allowing to Pass.

```
db.('TCPWorldBase').aggregate([
    {'$match':
    {'dest_port': {$in: [ '137', '139', '445']}}
    },
    {"$project":
    {"security_app": "In home networked security device World Sensor",
    "_id": 0,
  "event_type": "RansomWare Attack",
    "src_country": "$src_country",
  "src_city": "$src_city",
    "src_country_summary": "$src_geo",
    "src_ip": "$src_ip",
    "src_port": "$src_port",
    "dest_ip": "$dest_ip",
    "dest_port": "$dest_port",
  "alert_signature": "RansomWare Attack BLOCKED by In home networked security device",
    "alert_sigature_id": "201804010001",
    "alert_category": "Automated Malicious Virus",
    "alert_severity": "8",
    "alert_action": "blocked",
    "protocol": "tcp",
    "aggr_count": "$aggr_count" }},
  {"$out": "db.in home networked security deviceThrAct" }
```

Figure 12:
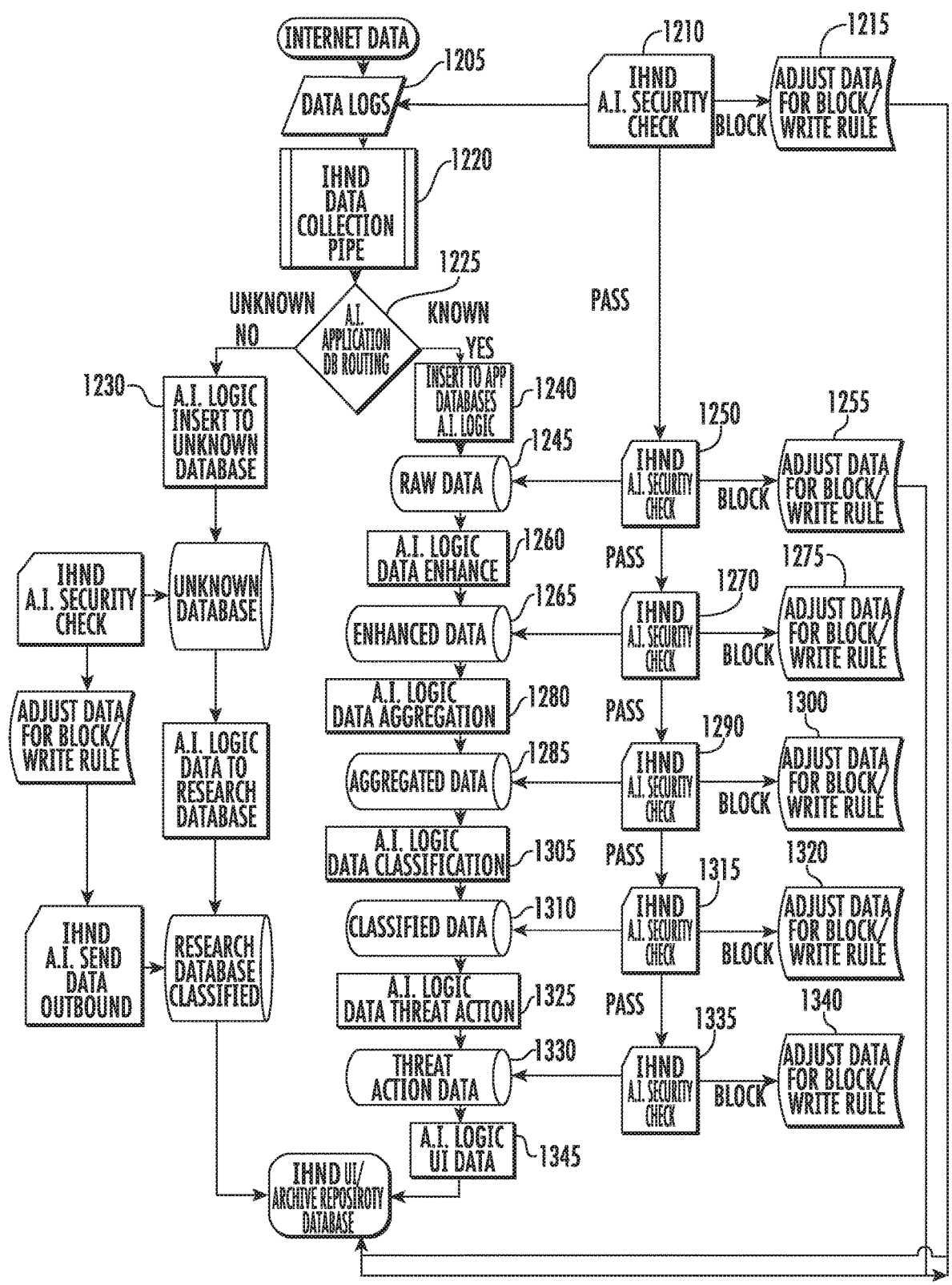
FIG. 12 is a flowchart illustrating operations of the artificial intelligence service configured to process incoming data and generate blocking/write rules in response to the nature of the data in some embodiments according to the invention.

FIG. 12 is a flowchart illustrating operations of the artificial intelligence service configured to process incoming data and generate blocking/write rules in response to the nature of the data in some embodiments according to the invention. According to FIG. 12, data is received from the data logs (block 1205) and an artificial intelligence service security check 1210 is performed on the data in the data logs and if the artificial intelligence security check determines a potential threat in the data provided in the data logs, a block rule can be generated (block 1215).

In further operations, the in home network device can provide the data logs to the artificial intelligence application database routing logic (block 1225) via the in home networking device data collection pipe (block 1220). If the artificial intelligence application database routing logic determines that the data is not a recognized threat, the data is provided to an artificial intelligence logic database for storage and later reference open (block 1230).

If however the artificial intelligence application database logic recognizes the data (block 1225), the data is routed to a series of containers and corresponding data checks and potential block rules which may be performed in the sequence show. In particular, the data may first be provided to the AI database logic open (block 1240) which can provide the data as raw data (block 1245) and an artificial intelligence security check is performed thereon (block 1250). If the artificial intelligence service recognizes the data is a known threat, a block rule can be created based on the data recognized (block 1255).

If however the data is not recognized as a known threat the security check is passed and the raw data is passed to the next database which organizes the data as enhanced data such as that having additional attribute fields provided (block 1260). The enhanced data is then check (block 1265) and if the enhanced data is recognized as a known threat, a block rule can be created (block 1275).

The process described above can continue through the artificial intelligence logic data aggregation database (block 1280) through the direct action data base (block 1330) where at each step the artificial intelligence service analyzes the data to determine if the data in its present form matches a known threat whereupon a particular block rule can be created. Otherwise if all of the artificial intelligence security checks resulted in a pass then the data is allowed to proceed from the in home networking device.

The operations described herein can be carried out by processor circuits. Examples of a processor circuit can include logic, one or more components, circuits (e.g., modules), or mechanisms. Circuits are tangible entities configured or programmed to perform certain operations. In an example, processor circuits can be arranged (e.g., internally or with respect to external entities such as other circuits) in a specified manner. In an example, one or more processor circuits can be configured by software (e.g., instructions, an application portion, or an application) as a circuit that operates to perform certain operations as described herein. In an example, the software can reside (1) on a non-transitory machine readable medium (such as a memory) or (2) in a transmission signal.

In an example, a circuit can be implemented mechanically or electronically. For example, a circuit can comprise dedicated circuitry or logic that is specifically configured to perform one or more techniques such as discussed above, such as including a special-purpose processor, a field programmable gate array (FPGA) or an application-specific integrated circuit (ASIC). In an example, a circuit can comprise programmable logic (e.g., circuitry, as encompassed within a general-purpose processor or other programmable processor) that can be temporarily configured (e.g., by software) to perform the certain operations. It will be appreciated that the decision to implement a circuit mechanically (e.g., in dedicated and permanently configured circuitry), or in temporarily configured circuitry (e.g., configured by software) can be driven by cost and time considerations.

Accordingly, the term "circuit" is understood to encompass a tangible entity, be that an entity that is physically constructed, permanently configured (e.g., hardwired), or temporarily (e.g., transitorily) configured (e.g., programmed) to operate in a specified manner or to perform specified operations. In an example, given a plurality of temporarily configured circuits, each of the circuits need not be configured or instantiated at any one instance in time. For example, where the circuits comprise a general-purpose processor configured via software, the general-purpose processor can be configured as respective different circuits at different times. Software can accordingly configure a processor circuit, for example, to constitute a particular circuit at one instance of time and to constitute a different circuit at a different instance of time.

In an example, processor circuits can provide information to, and receive information from, other circuits. In this example, the processor circuits can be regarded as being communicatively coupled to one or more other circuits. Where multiple of such circuits exist contemporaneously, communications can be achieved through signal transmission (e.g., over appropriate circuits and buses) that connect the circuits. In embodiments in which multiple circuits are configured or instantiated at different times, communications between such circuits can be achieved, for example, through the storage and retrieval of information in memory structures to which the multiple circuits have access. For example, one processor circuit can perform an operation and store the output of that operation in a memory device to which it is communicatively coupled. A further processor circuit can then, at a later time, access the memory device to retrieve and process the stored output. In an example, circuits can be configured to initiate or receive communications with input or output devices and can operate on a resource (e.g., a collection of information).

The various operations of method examples described herein can be performed, at least partially, by one or more processors that are temporarily configured (e.g., by software) or permanently configured to perform the relevant operations. Whether temporarily or permanently configured, such processors can constitute processor-implemented circuits that operate to perform one or more operations or functions. In an example, the circuits referred to herein can comprise processor-implemented circuits.

Similarly, the methods described herein can be at least partially processor-implemented. For example, at least some of the operations of a method can be performed by one or processors or processor-implemented circuits. The performance of certain of the operations can be distributed among the one or more processors, not only residing within a single machine, but deployed across a number of machines. In an example, the processor or processors can be located in a single location (e.g., within a home environment, an office environment or as a server farm), while in other examples the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., Application Program Interfaces (APIs).)

Example embodiments (e.g., apparatus, systems, or methods) can be implemented in digital electronic circuitry, in computer hardware, in firmware, in software, or in any combination thereof. Example embodiments can be implemented using a computer program product (e.g., a computer program, tangibly embodied in an information carrier or in a machine readable medium, for execution by, or to control the operation of, data processing apparatus such as a programmable processor, a computer, or multiple computers).

A computer program can be written in any form of programming language, including compiled or interpreted languages, and it can be deployed in any form, including as a stand-alone program or as a software module, subroutine, or other unit suitable for use in a computing environment. A computer program can be deployed to be executed on one computer or on multiple computers at one site or distributed across multiple sites and interconnected by a communication network.

In an example, operations can be performed by one or more programmable processor circuits executing a computer program to perform functions by operating on input data and generating output. Examples of method operations can also be performed by, and example apparatus can be implemented as, special purpose logic circuitry (e.g., a field programmable gate array (FPGA) or an application-specific integrated circuit (ASIC)).

Some of the systems described herein, can include clients and servers. A client and server are generally remote from each other and generally interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware and software architectures that can be deployed in example embodiments.

The machine readable medium described herein can include a single medium or multiple media (e.g., a local memory closely coupled to the processor circuit, a centralized or distributed database, and/or associated caches and servers) that configured to store the one or more instructions. The term "machine readable medium" can also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine readable medium" can accordingly be taken to include, but not be limited to, solid-state memories, and optical and magnetic media. Specific examples of machine readable media can include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions can further be transmitted or received over a communications network using a transmission medium via the network interface device utilizing any one of a number of transfer protocols (e.g., frame relay, IP, TCP, UDP, HTTP, etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 standards family known as Wi-Fi®, IEEE 802.16 standards family known as WiMax®), peer-to-peer (P2P) networks, among others. The term "transmission medium" shall be taken to include any intangible medium that is capable of storing, encoding or carrying instructions for execution by the machine, and includes digital or analog communications signals or other intangible medium to facilitate communication of such software.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wired, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages, such as a programming language for a FPGA, Verilog, System Verilog, Hardware Description language (HDL), and VHDL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

While the foregoing is directed to aspects of the present disclosure, other and further embodiments of the disclosure may be devised without departing from the basic scope thereof, and the scope thereof is determined by the claims that follow.

What is claimed:

1. A non-transitory computer-readable medium whose contents, when executed by a computing system of a stand-alone in-home security device, cause the computing system to perform operations to provide security for an in-home network, the operations comprising: receiving home network internet datagrams from a modem at the stand-alone in-home security device to provide received home network internet datagrams, the received home network internet datagrams being all data packets received by the modem directed to the in-home network from outside; wherein the stand-alone in-home security device receives the home network internet datagrams from the modem via a communications interface; wherein the received home network internet datagrams are not formatted as IPv4 and IPv6 traffic; analyzing the received home network internet datagrams using an artificial intelligence service to identify a type of security threat included in the received home network internet datagrams, wherein the artificial intelligence service is configured to process the received home network internet datagrams only at Layer 2 of an OSI Model to separate the datagrams into attribute fields; selecting a security application from among a plurality of security applications included in an in-home network security application suite based on the type of security threat identified in the received home network internet datagrams by the artificial intelligence service to provide a selected security application, wherein the plurality of security applications included in the in-home network security application suite comprises a firewall function, an anti-virus function, a URL filtering function, and a ransom ware function; using the selected security application to identify threat data packets included in the received home network internet datagrams that are associated with the type of security threat identified in the received home network internet datagrams, wherein the firewall function is configured to block all internet datagrams associated with an IP address transmitting the threat data packets; wherein the firewall function is configured to process the received home network internet datagrams at Layer 2 of the OSI Model; blocking the threat data packets from being forwarded downstream to an in-home network router coupled to the stand-alone in-home security device located in the in home network between the modem and the in-home network router, wherein the stand-alone in-home security device forwards the data packets that are not included in the threat data packets to the in-home router via the communications interface; wherein the in-home network router is configured to process internet protocol information at Layer 3 of the OSI model.

2. The non-transitory computer-readable medium of claim 1 wherein the artificial intelligence service is configured to process all of the received home network internet datagrams at Layer 2 of the OSI Model to separate the datagrams into the attribute fields.

* * * * *

UNITED STATES PATENT AND TRADEMARK OFFICE
CERTIFICATE OF CORRECTION

| | | |
|---|---|---|
| PATENT NO. | : 11,909,768 B2 | Page 1 of 1 |
| APPLICATION NO. | : 16/992503 | |
| DATED | : February 20, 2024 | |
| INVENTOR(S) | : Erik J. Barnett | |

It is certified that error appears in the above-identified patent and that said Letters Patent is hereby corrected as shown below:

On the Title Page

Item (73) Assignee: Please correct "Secure Telligence LLC" to read -- SecureTelligence LLC --

Signed and Sealed this
Sixteenth Day of April, 2024

Katherine Kelly Vidal
*Director of the United States Patent and Trademark Office*